(12) United States Patent
Schreter

(10) Patent No.: US 8,768,891 B2
(45) Date of Patent: Jul. 1, 2014

(54) ENSURING DATABASE LOG RECOVERY CONSISTENCY

(75) Inventor: Ivan Schreter, Malsch (DE)

(73) Assignee: SAP AG, Walldorf (DE)

( * ) Notice: Subject to any disclaimer, the term of this patent is extended or adjusted under 35 U.S.C. 154(b) by 100 days.

(21) Appl. No.: 13/458,687

(22) Filed: Apr. 27, 2012

(65) Prior Publication Data
US 2013/0290268 A1  Oct. 31, 2013

(51) Int. Cl.
*G06F 17/00* (2006.01)
*G06F 17/30* (2006.01)

(52) U.S. Cl.
CPC ............... *G06F 17/00* (2013.01); *G06F 17/30* (2013.01)
USPC ........... 707/682; 707/661; 707/672; 707/703; 707/802

(58) Field of Classification Search
CPC ................................ G06F 17/00; G06F 17/30
USPC ......... 707/609–611, 615–617, 639–641, 661, 707/672, 674–685, 703, 802; 711/161–165
See application file for complete search history.

(56) References Cited

U.S. PATENT DOCUMENTS

| | | | | |
|---|---|---|---|---|
| 5,832,508 | A * | 11/1998 | Sherman et al. ...................... | 1/1 |
| 6,321,234 | B1 * | 11/2001 | Debrunner ............................ | 1/1 |
| 6,629,264 | B1 * | 9/2003 | Sicola et al. ................... | 714/15 |
| 6,651,077 | B1 * | 11/2003 | East et al. ............................. | 1/1 |
| 2002/0007363 | A1 * | 1/2002 | Vaitzblit ....................... | 707/202 |
| 2004/0030703 | A1 * | 2/2004 | Bourbonnais et al. ........ | 707/100 |
| 2005/0131853 | A1 * | 6/2005 | Sampath et al. .................. | 707/1 |
| 2006/0101083 | A1 * | 5/2006 | Cherkauer et al. ............ | 707/200 |
| 2007/0038682 | A1 * | 2/2007 | Kulesza et al. ............... | 707/202 |
| 2007/0185938 | A1 * | 8/2007 | Prahlad et al. ................ | 707/204 |
| 2009/0077329 | A1 * | 3/2009 | Wood et al. .................... | 711/156 |
| 2009/0171707 | A1 * | 7/2009 | Bobak et al. ....................... | 705/7 |
| 2010/0082529 | A1 * | 4/2010 | Mace et al. .................... | 707/609 |

(Continued)

FOREIGN PATENT DOCUMENTS

WO   WO 01/77908   * 10/2001

OTHER PUBLICATIONS

Anonymous. "SQL Server: Understanding Logging and Recovery in SQL Server."(Nov. 18, 2010)Retrieved from the Internet:; URL:http://wayback.archive.org/web/20101118002743/http://technet.microsoft.com/en-us/magazine/2009.02.1ogging.aspx [retrieved on Apr. 28, 2014].

(Continued)

*Primary Examiner* — Srirama Channavajjala
(74) *Attorney, Agent, or Firm* — Mintz Levin Cohn Ferris Glovsky and Popeo, P.C.

(57) ABSTRACT

A plurality of transactions are executed in a data storage application. Thereafter, log entries are sequentially stored according to the plurality of transactions in at least one log. Each log segment has a first globally unique identifier (GUID) uniquely identifying the log segment and includes a second GUID uniquely identifying an immediately preceding log segment in the sequence. In addition, the current position in the at least one log is stored along with the current log segment GUID together with data pages during data backup. Subsequently, a position in the at least one log from which to initiate replay of the log segments and a GUID for a corresponding log segment at the determined position at database recovery time is determined based on information stored during data backup. Replay of the log segments is then initiated starting at the determined position. Related apparatus, systems, techniques and articles are also described.

12 Claims, 4 Drawing Sheets

(56) References Cited

U.S. PATENT DOCUMENTS

| | | | |
|---|---|---|---|
| 2011/0295969 A1* | 12/2011 | Bernstein et al. | 709/217 |
| 2012/0011098 A1* | 1/2012 | Yamada | 707/623 |
| 2013/0117233 A1* | 5/2013 | Schreter | 707/648 |
| 2013/0117235 A1* | 5/2013 | Schreter | 707/682 |
| 2013/0117237 A1* | 5/2013 | Thomsen et al. | 707/683 |
| 2013/0117241 A1* | 5/2013 | Schreter | 707/692 |

OTHER PUBLICATIONS

Elmasri, Ramez, and Shamkant B. Navathe. Eds. "Chapter 23: Database Recovery Techniques." *Fundamentals of Database Systems*. Sixth Edition. Addison-Wesley. (Jan. 1, 2007). pp. 807-832. Print.

European Search Report issued in European Patent Application No. 13002137, dated May 14, 2014.

\* cited by examiner

ENSURING DATABASE LOG RECOVERY CONSISTENCY

TECHNICAL FIELD

The subject matter described herein relates to techniques for ensuring consistent database log recovery using globally unique identifier (GUID) sequences.

BACKGROUND

Most databases write their data into data area asynchronously and use logging to store operations done on the data synchronously to the log. To guarantee the recoverability of the data in a catastrophic situation, both data and log areas are backed up to some tertiary medium (e.g., set of backup tapes). Usually, the data area is backed up periodically (e.g., once a day) and new log segments in the log area are backed up as soon as they are closed. In case of a catastrophic situation requiring data recovery, the data area is recovered from a backup to an older state (last valid data backup). Replaying backed up log segments backed up after this data backup will bring the database to the last committed state contained in the backed up log (and if the log area is still available, replaying further not-yet-backed-up log segments from the log area even to the last committed state while the database system was online).

When the recovery is finished, a new log segment will be started, where new data will be written. This process may invalidate certain portion of the log. In addition, in enterprise settings, there are usually many databases in production and they may be even copied/cloned, so it is possible that a system administrator might select an incorrect backup and try to restore from it. In most cases, this will lead to severe data errors and database crashes.

Other issues may arise in high availability settings in which the same database is kept in a master mode and a hot-standby mode using log shipping to a remote location. When temporarily both master and hot standby run at the same time, and log backups are taken on both, during take-over there can be an ambiguous recovery path. This recovery path has to be detected and resolved in order to ensure consistent recovery.

SUMMARY

In one aspect, a plurality of transactions are executed in a data storage application. Thereafter, log entries are sequentially stored according to the plurality of transactions in at least one log. Each log segment has a first globally unique identifier (GUID) uniquely identifying the log segment and includes a second GUID uniquely identifying an immediately preceding log segment in the sequence. In addition, the current position in the at least one log is stored along with the current log segment GUID together with data pages during data backup. Subsequently, a position in the at least one log from which to initiate replay of the log segments and a GUID for a corresponding log segment at the determined position at database recovery time is determined based on information stored during data backup. Replay of the log segments is then initiated starting at the determined position.

The data storage application can use shadow paging to write a transactionally-consistent savepoint. A data backup corresponding to the plurality of executed transactions can include a copy of all data pages contained with a particular savepoint. Each log segment further can include a database identifier identifying a database where such log segment is stored.

Each log segment can be used for the replay is provided to a data recovery process. The data recovery process can verify that the GUIDs stored with each log segment correspond to the sequence according to which the log segments were stored. The data storage application can be an in-memory database.

Articles of manufacture are also described that comprise computer executable instructions permanently stored on non-transitory computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein. In addition, operations specified by methods can be implemented by one or more data processors either within a single computing system or distributed among two or more computing systems.

The subject matter described herein provides many advantages. For example, the current subject matter helps prevent log recovery from incorrect log segment backups in database systems.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
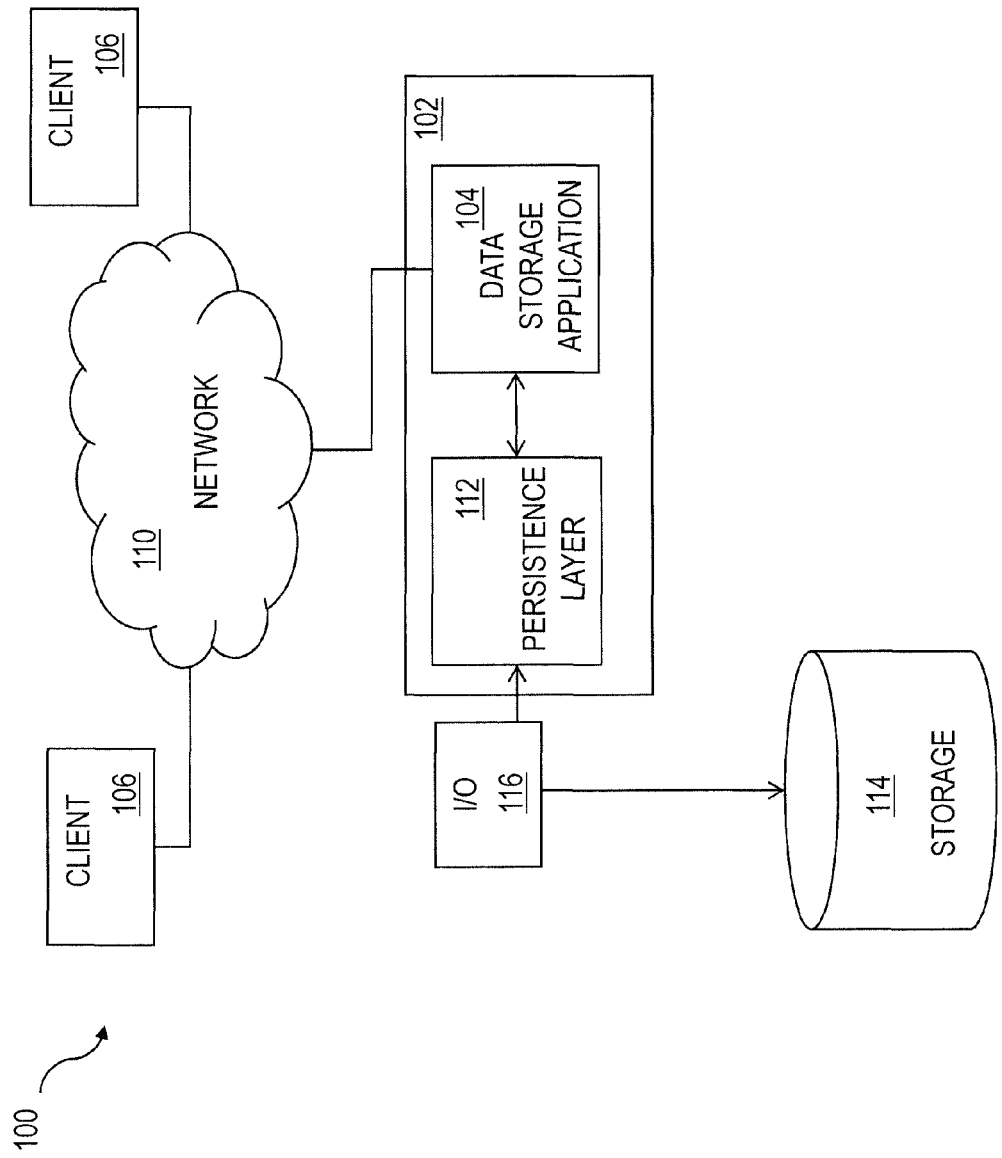
FIG. 1 is a diagram illustrating a system including a data storage application.

FIG. 1 shows an example of a system 100 in which a computing system 102, which can include one or more programmable processors that can be collocated, linked over one or more networks, etc., executes one or more modules, software components, or the like of a data storage application 104. The data storage application 104 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 102 as well as to remote users accessing the computing system 102 from one or more client machines 106 over a network connection 110. One or more user interface screens produced by the one or more first modules can be displayed to a user, either via a local display or via a display associated with one of the client machines 106. Data units of the data storage application 104 can be transiently stored in a persistence layer 112 (e.g. a page buffer or other type of temporary persistency layer), which can write the data, in the form of storage pages, to one or more storages 114, for example via an input/output component 116. The one or more storages 114 can include one or more physical storage media or devices (e.g. hard disk drives, persistent flash memory, random access memory, optical media, magnetic media, and the like) configured for writing data for longer term storage. It should be noted that the storage 114 and the input/output component 116 can be included in the computing system 102 despite their being shown as external to the computing system 102 in FIG. 1.

Data retained at the longer term storage 114 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 2:
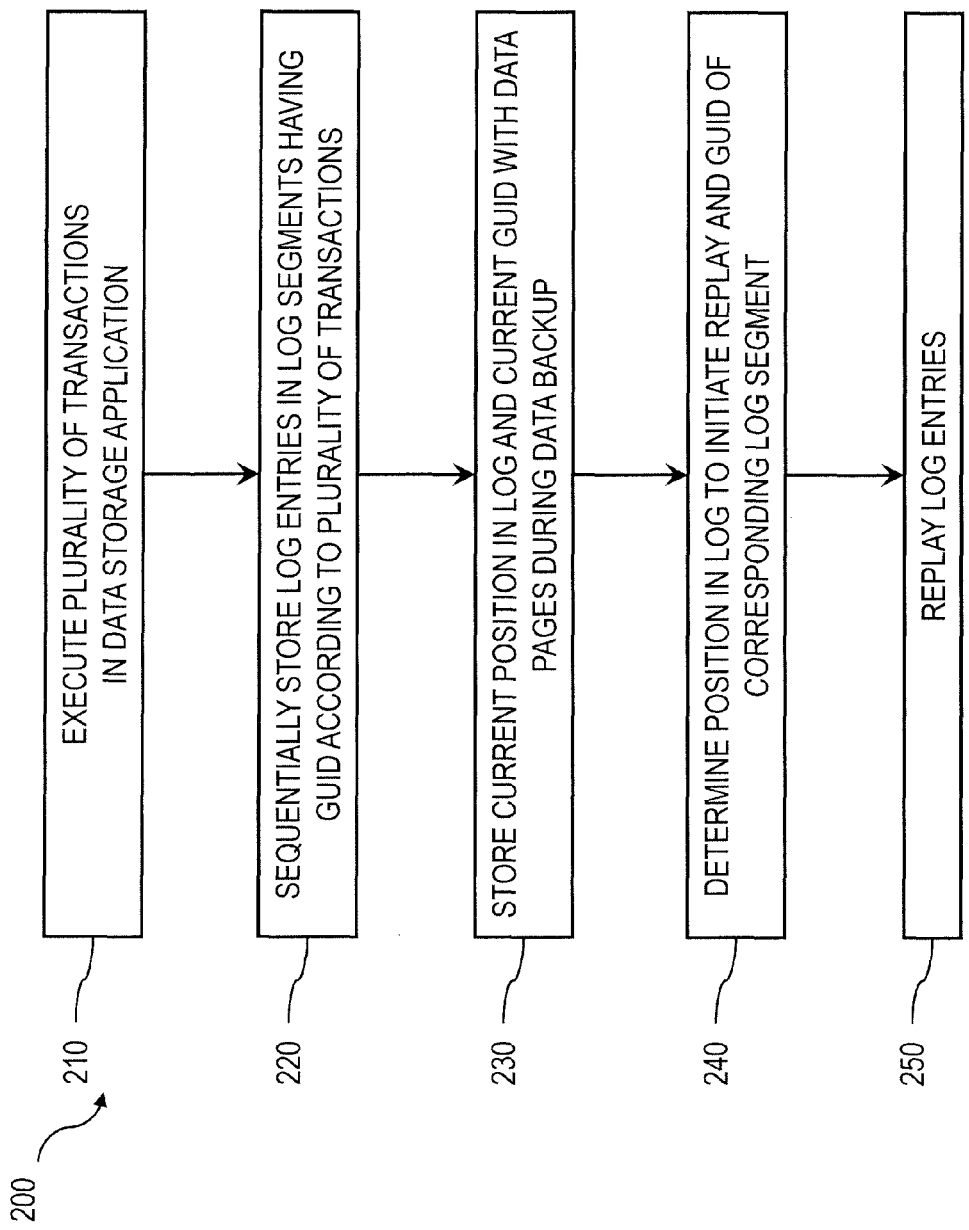
FIG. 2 is a process flow diagram illustrating a technique for generating log segments with GUIDs.

FIG. 2 is a process flow diagram 200 in which, at 210, a plurality of transactions are executed in a data storage application. Thereafter, at 220, log entries are sequentially stored according to the plurality of transactions in at least one log. Each log segment has a first globally unique identifier (GUID) uniquely identifying the log segment and includes a second GUID uniquely identifying an immediately preceding log segment in the sequence. In addition, at 230, the current position in the at least one log is stored along with the current log segment GUID together with data pages during data backup. Subsequently, at 240, a position in the at least one log from which to initiate replay of the log segments and a GUID for a corresponding log segment at the determined position at database recovery time is determined based on information stored during data backup. Replay of the log segments is then, at 250, initiated starting at the determined position.

Figure 3:
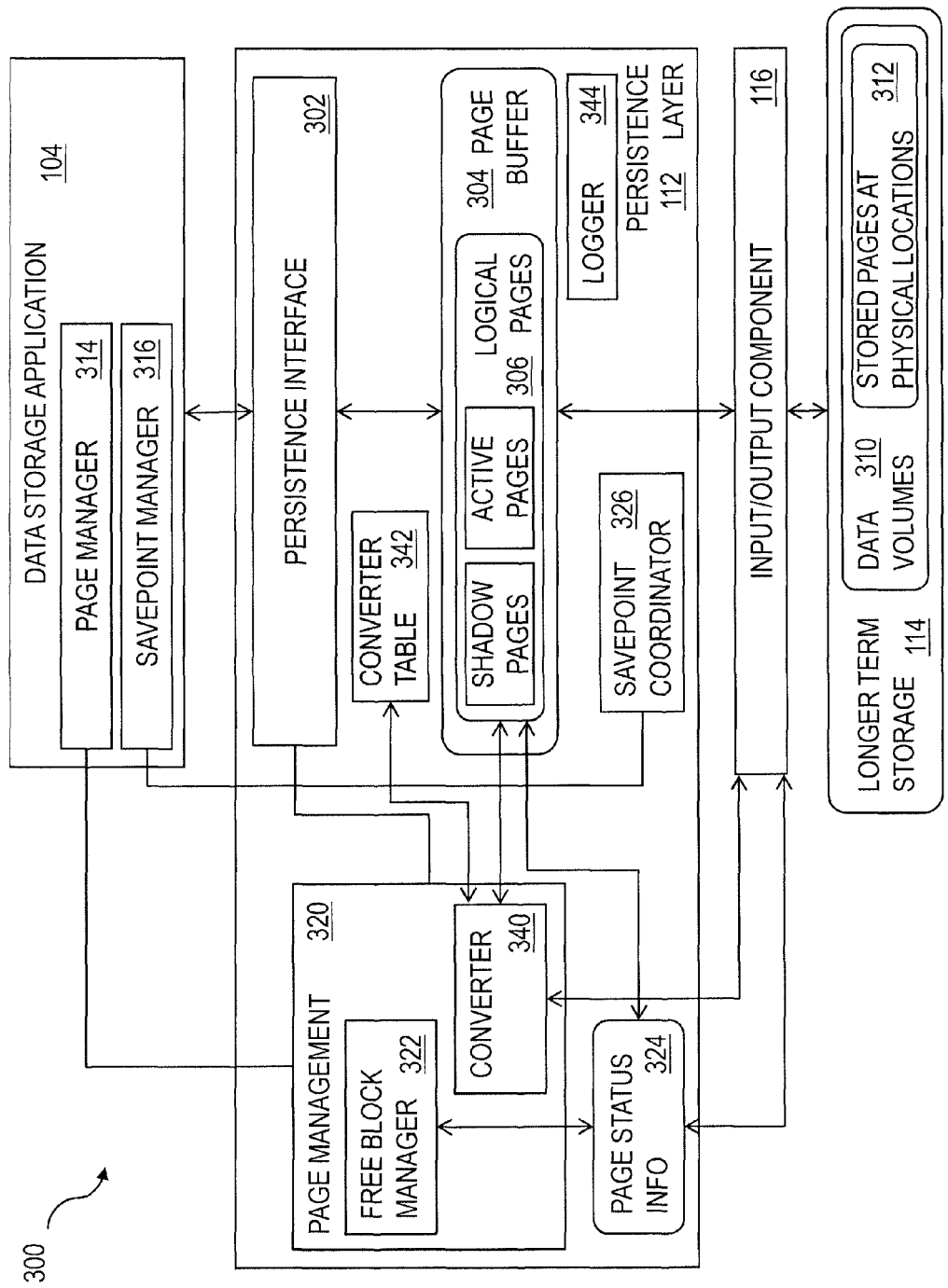
FIG. 3 is a diagram illustrating details of the system of FIG. 1.

FIG. 3 shows a software architecture 300 consistent with one or more features of the current subject matter. A data storage application 104, which can be implemented in one or more of hardware and software, can include one or more of a database application, a network-attached storage system, or the like. According to at least some implementations of the current subject matter, such a data storage application 104 can include or otherwise interface with a persistence layer 112 or other type of memory buffer, for example via a persistence interface 302. A page buffer 304 within the persistence layer 112 can store one or more logical pages 306, and optionally can include shadow pages, active pages, and the like. The logical pages 306 retained in the persistence layer 112 can be written to a storage (e.g. a longer term storage, etc.) 114 via an input/output component 116, which can be a software module, a sub-system implemented in one or more of software and hardware, or the like. The storage 114 can include one or more data volumes 310 where stored pages 312 are allocated at physical memory blocks.

In some implementations, the data storage application 104 can include or be otherwise in communication with a page manager 314 and/or a savepoint manager 316. The page manager 314 can communicate with a page management module 320 at the persistence layer 112 that can include a free block manager 322 that monitors page status information 324, for example the status of physical pages within the storage 114 and logical pages in the persistence layer 112 (and optionally in the page buffer 304). The savepoint manager 316 can communicate with a savepoint coordinator 326 at the persistence layer 204 to handle savepoints, which are used to create a consistent persistent state of the database for restart after a possible crash.

In some implementations of a data storage application 104, the page management module of the persistence layer 112 can implement a shadow paging. The free block manager 322 within the page management module 320 can maintain the status of physical pages. The page buffer 304 can included a fixed page status buffer that operates as discussed herein. A converter component 340, which can be part of or in communication with the page management module 320, can be responsible for mapping between logical and physical pages written to the storage 114. The converter 340 can maintain the current mapping of logical pages to the corresponding physical pages in a converter table 342. The converter 340 can maintain a current mapping of logical pages 306 to the corresponding physical pages in one or more converter tables 342. When a logical page 306 is read from storage 114, the storage page to be loaded can be looked up from the one or more converter tables 342 using the converter 340. When a logical page is written to storage 114 the first time after a savepoint, a new free physical page is assigned to the logical page. The free block manager 322 marks the new physical page as "used" and the new mapping is stored in the one or more converter tables 342.

The persistence layer 112 can ensure that changes made in the data storage application 104 are durable and that the data storage application 104 can be restored to a most recent committed state after a restart. Writing data to the storage 114 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 344 can also be included to store the changes made to the data of the data storage application in a linear log. The logger component 344 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 344 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 112 can use a combination of undo log entries (from one or more logs) and shadow paging.

The persistence interface 302 can handle read and write requests of stores (e.g., in-memory stores, etc.). The persistence interface 302 can also provide write methods for writing data both with logging and without logging. If the logged write operations are used, the persistence interface 302 invokes the logger 344. In addition, the logger 344 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 344. For an entry of type "update", for example, this would be the identification of the affected record and the after image of the modified data.

When the data application 104 is restarted, the log entries need to be processed. To speed up this process the redo log is not always processed from the beginning. Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 344 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 344 can write a database log (or simply referred to herein as a "log") sequentially into a memory buffer in natural order (e.g., sequential order, etc.). If several physical hard disks/storage devices are used to store log data, several log partitions can be defined. Thereafter, the logger 344 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 104 can use shadow paging so that the savepoint manager 316 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 4:
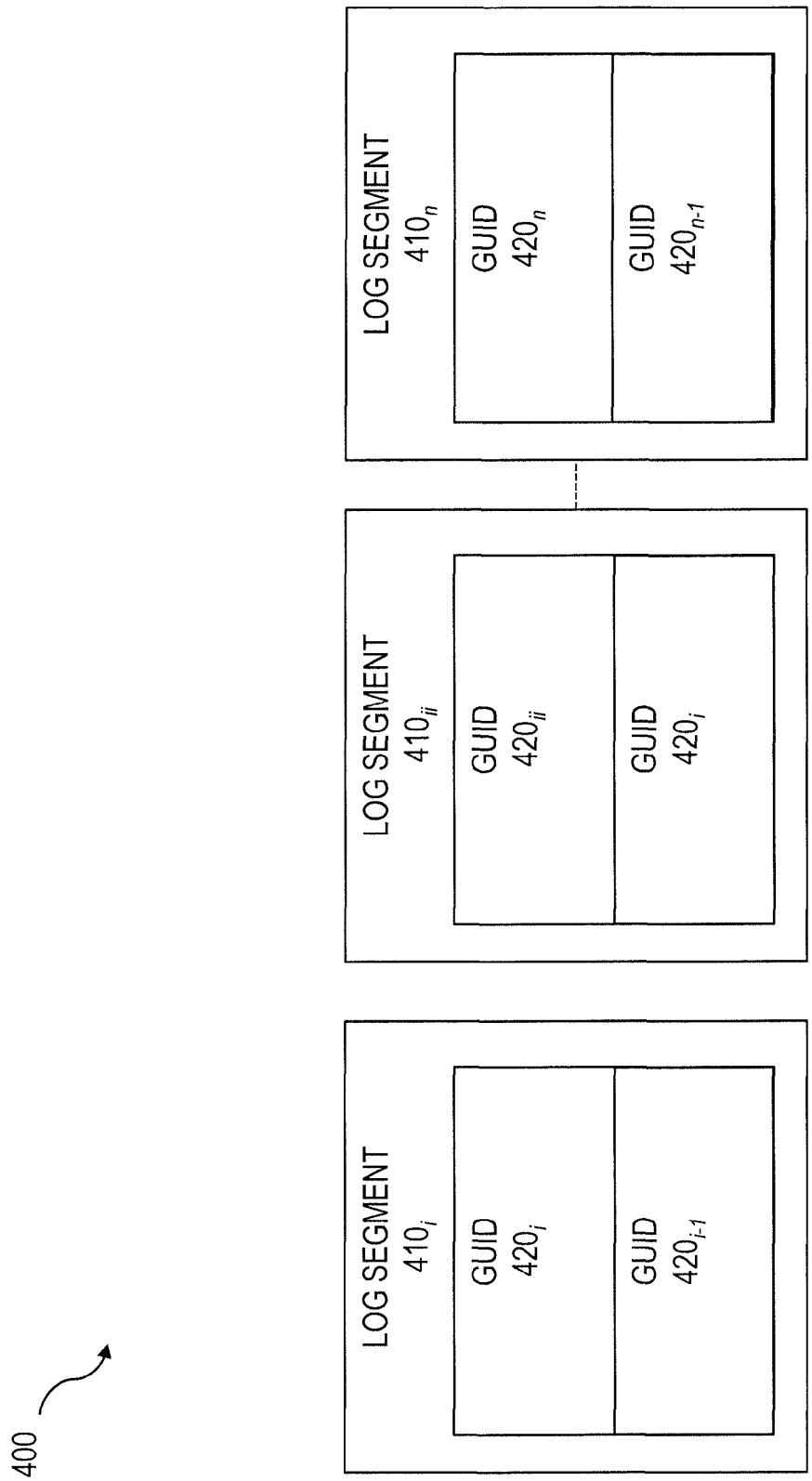
FIG. 4 is a diagram illustrating log segments having first and second GUIDs.

With reference to the diagram 400 of FIG. 4, when a new log segment 410 is started, the logger 344 can generate a GUID (globally-unique identifier) 420 that is associated with this log segment $410_i$. In addition, the logger 344 can associate a GUID $420_{i-1}$ of the immediately previous log segment $410_{i-1}$ (not shown) with the new segment as well. During log segment backup, these two GUIDs $420_i$, $420_{i-1}$ can form part of the backup for that particular log segment ($410_i$).

Let's assume the log segment $410_{ii}$ is the current log segment at data backup start. When a data backup is started, the GUID $420_{ii}$ of the current log segment $410_{ii}$ (i.e., where the savepoint log record will be written) can be stored in the data area (i.e., the data area together with log position of the savepoint log record in log segment $410_{ii}$ and log segment GUID $420_{ii}$ are thus part of the savepoint and also of the data backup). Further information, such as database name can also be associated with the backup.

At recovery time, the administrator can start data recovery by recovering a transactionally-consistent state from the data backup (which is a copy of the data from the corresponding backup savepoint). As mentioned above, this backup can contain the log position where to start the log recovery and the GUID $420_{ii}$ of the log segment to which this log position belongs (assuming one is recovering from backup done when log segment $410_{ii}$ was the current log segment).

After the data recovery is done, the administrator can continue the recovery by providing log segments $410_{ii \ldots n}$ to the recovery process (either manually or automatically without human intervention), starting with log segment $410_{ii}$ containing the needed log replay start position. If the administrator would try to use the log segment $410_j$ from another database, the recovery process would detect this, because GUID $420_j$ of the log segment would not match the GUID $420_{ii}$ stored in the backup. The administrator can then continue the recovery using the correct log segment $410_{ii \ldots n}$ or finish/abort the recovery.

When further log segment backups are provided for log recovery, it is also possible to check for the correct sequence by comparing the GUID $420_{i \ldots n}$ of the next log segment backup against the GUID $420_{i-1 \ldots n-1}$ of the previous log segment backup because each log segment $410_{i \ldots n}$ backup contains also GUID $420_{i-1 \ldots n-1}$ of the previous log segment. Again, if a wrong log segment is provided, the administrator can continue the recovery using the correct log segment $410_{i \ldots n}$, or finish/abort the recovery.

Aspects of the subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. A client and server are generally, but not exclusively, remote from each other and typically interact through a communication network, although the components of the system can be interconnected by any form or medium of digital data communication. Examples of communication networks include, but are not limited to, a local area network ("LAN"), a wide area network ("WAN"), and the Internet. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or embodiments.

What is claimed is:

1. A non-transitory computer program product storing instructions that, when executed by at least one programmable processor, cause the at least one programmable processor to perform operations comprising:
   executing a plurality of transactions in a data storage application;
   sequentially storing log entries in log segments according to the plurality of transactions in at least one log, each log segment having a first globally unique identifier (GUID) uniquely identifying the log segment and comprising a second GUID uniquely identifying an immediately preceding log segment in the sequence, the log segments being written according to a load-balance technique among a plurality of log partitions stored on a plurality of physical storage devices;
   storing current position in the at least one log and current log segment GUID together with data pages during data backup;
   determining a position in the at least one log from which to initiate replay of the log segments and a GUID for a corresponding log segment at the determined position at database recovery time based on information stored during data backup; and
   initiating replay of the log segments starting at the determined position, the replay comprising checking for a correct sequence of log segments by comparing a first GUID for a first provided log segment with a second GUID for a next provided log segment;
   wherein:
      each log segment further comprises a database identifier identifying a database where such log segment is stored, and
      each log segment used for the replay is provided to a data recovery process that verifies that the GUIDs stored with each log segment correspond to the sequence according to which the log segments were stored.

2. A computer program product as in claim 1, wherein the data storage application uses shadow paging to write a transactionally-consistent savepoint.

3. A computer program product as in claim 2, wherein a data backup corresponding to the plurality of executed transactions comprises a copy of all data pages contained with a particular savepoint.

4. A computer program product as in claim 1, wherein the data storage application comprises an in-memory database.

5. A method comprising:
   executing a plurality of transactions in a data storage application;
   sequentially storing log entries in log segments according to the plurality of transactions in at least one log, each log segment having a first globally unique identifier (GUID) uniquely identifying the log segment and comprising a second GUID uniquely identifying an immediately preceding log segment in the sequence;
   storing current position in the at least one log and current log segment GUID together with data pages during data backup;
   determining a position in the at least one log from which to initiate replay of the log segments and a GUID for a corresponding log segment at the determined position at database recovery time based on information stored during data backup; and
   initiating replay of the log segments starting at the determined position
   wherein:
      each log segment further comprises a database identifier identifying a database where such log segment is stored, and
      each log segment used for the replay is provided to a data recovery process that verifies that the GUIDs stored with each log segment correspond to the sequence according to which the log segments were stored.

6. A method as in claim 5, wherein one or more of the executing, sequentially storing, storing, determining, and initiating are performed by at least one data processor within at least one computing system.

7. A method as in claim 5, wherein the data storage application uses shadow paging to write a transactionally-consistent savepoint.

8. A method as in claim 7, wherein a data backup corresponding to the plurality of executed transactions comprises a copy of all data pages contained with a particular savepoint.

9. A method as in claim 5, wherein the data storage application comprises an in-memory database.

10. A system comprising:
one or more data processors;
an in-memory database forming part of a data storage application;
memory storing instructions, which when executed by at least one data processor, result in operations comprising:
executing a plurality of transactions in the data storage application;
sequentially storing log entries in log segments according to the plurality of transactions in at least one log, each log segment having a first globally unique identifier (GUID) uniquely identifying the log segment and comprising a second GUID uniquely identifying an immediately preceding log segment in the sequence;
storing current position in the at least one log and current log segment GUID together with data pages during data backup;
determining a position in the at least one log from which to initiate replay of the log segments and a GUID for a corresponding log segment at the determined position at database recovery time based on information stored during data backup; and
initiating replay of the log segments starting at the determined position;
wherein:
each log segment further comprises a database identifier identifying a database where such log segment is stored, and
each log segment used for the replay is provided to a data recovery process that verifies that the GUIDs stored with each log segment correspond to the sequence according to which the log segments were stored.

11. A system as in claim 10, wherein the data storage application uses shadow paging to write a transactionally-consistent savepoint.

12. A system as in claim 11, wherein a data backup corresponding to the plurality of executed transactions comprises a copy of all data pages contained with a particular savepoint.

* * * * *